United States Patent
McPherson et al.

(10) Patent No.: US 9,705,686 B2
(45) Date of Patent: Jul. 11, 2017

(54) MEASURING RESOURCE CONSUMPTION IN A MULTI-TENANT PLATFORM-AS-A-SERVICE (PAAS) SYSTEM

(71) Applicant: Red Hat, Inc., Raleigh, NC (US)

(72) Inventors: Daniel McPherson, Raleigh, NC (US); Ravi Sankar Penta, Sunnyvale, CA (US)

(73) Assignee: Red Hat, Inc., Raleigh, NC (US)

( * ) Notice: Subject to any disclaimer, the term of this patent is extended or adjusted under 35 U.S.C. 154(b) by 263 days.

(21) Appl. No.: 13/973,285

(22) Filed: Aug. 22, 2013

(65) Prior Publication Data
US 2015/0058471 A1    Feb. 26, 2015

(51) Int. Cl.
*G06F 15/173*    (2006.01)
*H04L 12/14*    (2006.01)
*H04L 12/24*    (2006.01)

(52) U.S. Cl.
CPC ...... *H04L 12/1432* (2013.01); *H04L 41/5029* (2013.01)

(58) Field of Classification Search
CPC ............... G06Q 10/06; G06F 11/3419; G06F 17/30575; G06F 2201/865; G06F 2201/87
See application file for complete search history.

(56) References Cited

U.S. PATENT DOCUMENTS

| | | | |
|---|---|---|---|
| 7,013,315 B1 * | 3/2006 | Boothby | |
| 7,058,947 B1 * | 6/2006 | Raja | G06F 9/5027 709/223 |
| 8,346,747 B2 | 1/2013 | Liu et al. | |
| 2004/0260652 A1 * | 12/2004 | Rose | 705/51 |
| 2009/0299920 A1 | 12/2009 | Ferris et al. | |
| 2011/0138034 A1 | 6/2011 | Brookbanks et al. | |
| 2011/0208695 A1 * | 8/2011 | Anand et al. | 707/610 |
| 2012/0226808 A1 | 9/2012 | Morgan | |
| 2013/0080356 A1 | 3/2013 | Kaneko et al. | |

OTHER PUBLICATIONS

WSO2, "Cloud Native Advantage: Multi-Tenant, Shared Container PaaS," http://ccasoftware.files.wordpress.com/2012/08/wso2-whitepaper-cloud-native-advantage-multi-tenant-shared-container-paas-1.pdf, 14 pages, Jun. 19, 2012.
Pathirage et al., "A Multi-tenant Architecture for Business Process Executions," http://people.apache.org/~hemapani/research/papers/ode-multi-tenancy.pdf, 8 pages, retrieved on Sep. 3, 2013.

(Continued)

*Primary Examiner* — Brian Whipple
*Assistant Examiner* — Gregory P Tolchinsky
(74) *Attorney, Agent, or Firm* — Lowenstein Sandler LLP (57) ABSTRACT

Implementations for measuring resource consumption in a multi-tenant Platform-as-a-Service (PaaS) system are disclosed. A method of the disclosure includes determining, by a processing device, that a resource of an application of a multi-tenant Platform-as-a-Service (PaaS) system is initializing, the resource marked for usage tracking, accessing a list of initialization operations used in the initialization of the resource, determining that each of the initialization operations prior to a create usage record operation in the mapping are performed successfully, and creating a usage record for the resource using the create usage record operation.

20 Claims, 5 Drawing Sheets

(56) References Cited

OTHER PUBLICATIONS

Talukder et al., "Cloud Economics: Principles, Costs, and Benefits," http://link.springer.com/chapter/10.1007/978-1-84996-241-4_20, 3 pages, retrieved on Sep. 3, 2013.
An Oracle White Paper, "Oracle Cloud Computing," http://www.oracle.com/us/technologies/cloud/oracle-cloud-computing-wp-076373.pdf, 22 pages, May 2010.

* cited by examiner

MEASURING RESOURCE CONSUMPTION IN A MULTI-TENANT PLATFORM-AS-A-SERVICE (PAAS) SYSTEM

TECHNICAL FIELD

The implementations of the disclosure relate generally to Platform-as-a-Service (PaaS) environments and, more specifically, relate to measuring resource consumption in a multi-tenant PaaS system.

BACKGROUND

Currently, a variety of Platform-as-a-Service (PaaS) offerings exist that include software and/or hardware facilities for facilitating the execution of web applications in a cloud computing environment (the "cloud"). Cloud computing is a computing paradigm in which a customer pays a "cloud provider" to execute a program on computer hardware owned and/or controlled by the cloud provider. It is common for cloud providers to make virtual machines hosted on its computer hardware available to customers for this purpose.

The cloud provider typically provides an interface that a customer can use to requisition virtual machines and associated resources such as processors, storage, and network services, etc., as well as an interface a customer can use to install and execute the customer's program on the virtual machines that the customer requisitions, together with additional software on which the customer's program depends. For some such programs, this additional software can include software components, such as a kernel and an operating system, and/or middleware and a framework. Customers that have installed and are executing their programs "in the cloud" typically communicate with the executing program from remote geographic locations using Internet protocols.

PaaS offerings typically facilitate deployment of web applications without the cost and complexity of buying and managing the underlying hardware, software, and provisioning hosting capabilities, providing the facilities to support the complete life cycle of building, delivering, and servicing web applications that are entirely available from the Internet. Typically, these facilities operate as one or more virtual machines (VMs) running on top of a hypervisor in a host server.

BRIEF DESCRIPTION OF THE DRAWINGS

The disclosure will be understood more fully from the detailed description given below and from the accompanying drawings of various implementations of the disclosure. The drawings, however, should not be taken to limit the disclosure to the specific implementations, but are for explanation and understanding only.

DETAILED DESCRIPTION

Implementations of the disclosure provide for measuring resource consumption in a multi-tenant Platform-as-a-Service (PaaS) system. In one implementation the PaaS system includes a usage tracking module to measure resource consumption by applications executed in the PaaS system. The usage tracking module measures resource consumption that PaaS providers may aim to charge for. Examples include, but are not limited to, Central Processing Unit (CPU) consumption, memory consumption, networking, and storage (bandwidth and quantity). The resource consumption may be tracked by usage tracking module based on users or accounts, as well as applications and gears (e.g., a resource-constrained process spaces to execute functionality of an application). An application can consist of multiple gears and the number of gears varies in time through scaling. Implementations of the disclosure may measure gear resource usage per time interval and then aggregate this usage for billing purposes. For example, PaaS provider controller may communicate tracked usage details, via network, with a billing provider for purposes of invoicing users of the PaaS system for the resource consumption.

In one implementation, a method of the disclosure includes determining, by a processing device, that a resource of an application of a multi-tenant PaaS system is initializing, the resource marked for usage tracking. The method further includes accessing a list (e.g., mapping) of operations performed to initialize the resource and determining that each of the initialization operations prior to a create usage record operation in the mapping are performed successfully. Lastly, the method includes creating a usage record for the resource using the create usage record operation. Tracking resource consumption by applications utilizing a PaaS system is beneficial for a variety of reasons including, but not limited to, efficient resource management, user feedback, and invoicing purposes.

Figure 1:
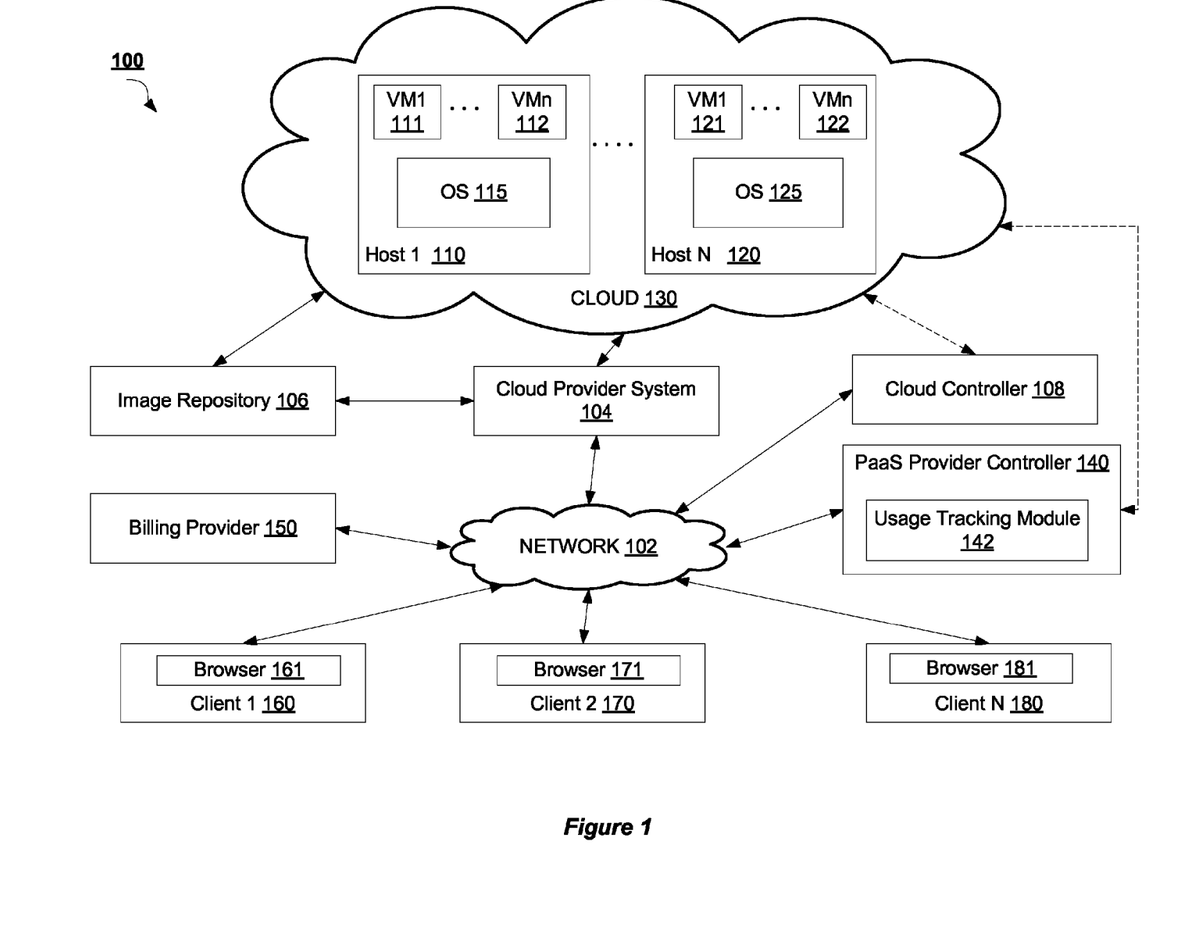
FIG. 1 is a block diagram of a network architecture in which implementations of the disclosure may operate.

FIG. 1 is a block diagram of a network architecture 100 in which implementations of the disclosure may operate. The network architecture 100 includes a cloud 130 managed by a cloud provider system 104. The cloud provider system 104 provides nodes to execute software and/or other processes. In some implementations, these nodes are virtual machines (VMs), such as VMs 111, 112, 121, and 122 hosted in cloud 130. Each VM 111, 112, 121, 122 is hosted on a physical machine, such as host 1 110 through host N 120, configured as part of the cloud 130. The VMs 111, 112, 121, 122 may be executed by OSes 115, 125 on each host machine 110, 120.

In some implementations, the host machines 110, 120 are often located in a data center. For example, VMs 111 and 112 are hosted on physical machine 110 in cloud 130 provided by cloud provider 104. Users can interact with applications executing on the cloud-based VMs 111, 112, 121, 122 using client computer systems, such as clients 160, 170 and 180, via corresponding web browser applications 161, 171 and 181. In other implementations, the applications may be hosted directly on hosts 1 through N 110-120 without the use of VMs (e.g., a "bare metal" implementation), and in such an implementation, the hosts themselves are referred to as "nodes".

Clients 160, 170 and 180 are connected to hosts 110, 120 on cloud 130 and the cloud provider system 104 via a network 102, which may be a private network (e.g., a local area network (LAN), a wide area network (WAN), intranet, or other similar private networks) or a public network (e.g., the Internet). Each client 160, 170, 180 may be a mobile device, a PDA, a laptop, a desktop computer, a tablet computing device, a server device, or any other computing device. Each host 110, 120 may be a server computer system, a desktop computer or any other computing device. The cloud provider system 104 may include one or more machines such as server computers, desktop computers, etc.

In one implementation, the cloud provider system 104 is coupled to a cloud controller 108 via the network 102. The cloud controller 108 may reside on one or more machines (e.g., server computers, desktop computers, etc.) and may manage the execution of applications in the cloud 130. In some implementations, cloud controller 108 receives commands from PaaS provider controller 140. Based on these commands, the cloud controller 108 provides data (e.g., such as pre-generated images) associated with different applications to the cloud provider system 104. In some implementations, the data may be provided to the cloud provider 104 and stored in an image repository 106, in an image repository (not shown) located on each host 110, 120, or in an image repository (not shown) located on each VM 111, 112, 121, 122. This data, is used for the execution of applications for a multi-tenant PaaS system managed by the PaaS provider controller 140.

In one implementation, the PaaS provider controller 140 includes a usage tracking module 142 to measure resource consumption in a multi-tenant Platform-as-a-Service (PaaS) system. The usage tracking module 142 measures resource consumption that PaaS providers may aim to charge for. Examples include, but are not limited to, CPU consumption, memory consumption, networking, storage (bandwidth and quantity), and any combination of the above. The resource consumption may be tracked by usage tracking module 142 based on users or accounts, as well as applications and gears. An application can consist of multiple gears and the number of gears varies in time through scaling. Implementations of the disclosure may measure gear resource usage per time interval (e.g., hours, minutes, seconds, etc.) and then aggregate this usage for billing purposes. For example, PaaS provider controller 140 may communicate tracked usage details, via network 102, with a billing provider 150 (e.g., third-party or otherwise) for purposes of invoicing users of the PaaS system for the resource consumption. Further details of measuring resource consumption in a multi-tenant PaaS system are described below with respect to FIG. 2.

While various implementations are described in terms of the environment described above, those skilled in the art will appreciate that the facility may be implemented in a variety of other environments including a single, monolithic computer system, as well as various other combinations of computer systems or similar devices connected in various ways. For example, the data from the image repository 106 may run directly on a physical host 110, 120 instead of being instantiated on a VM 111, 112, 121, 122.

Figure 2:
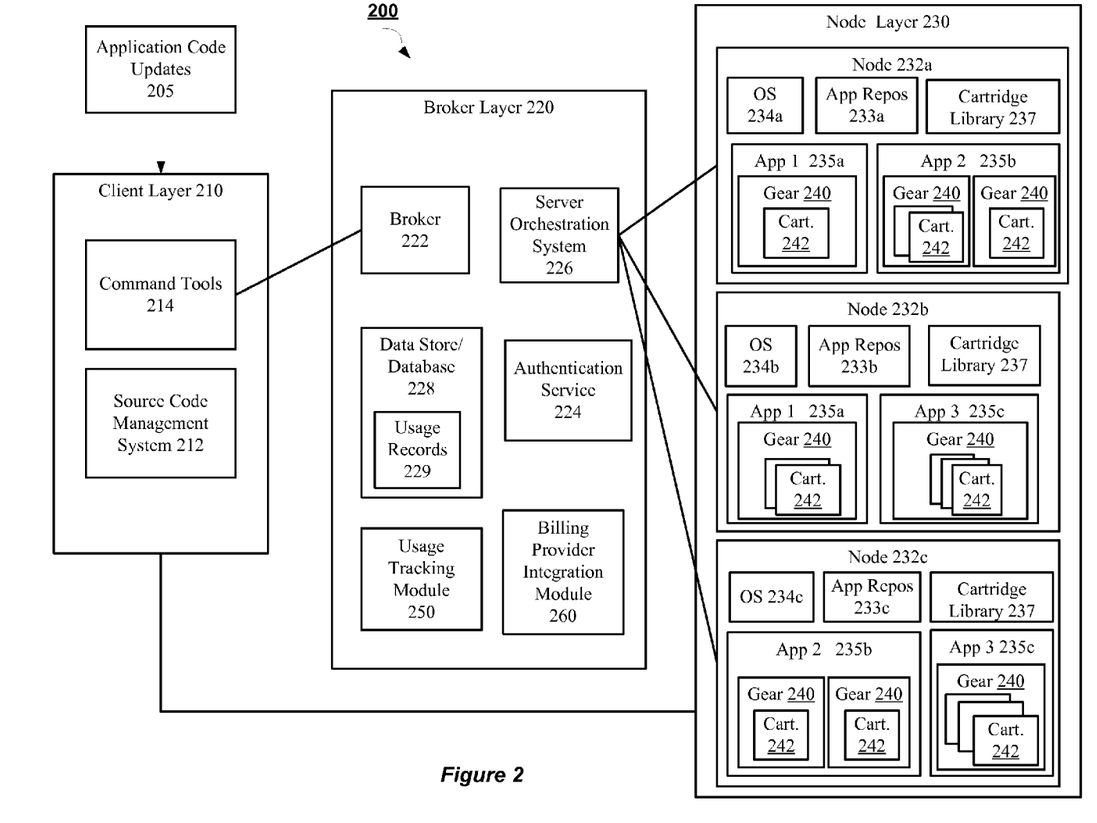
FIG. 2 is a block diagram of a Platform-as-a-Service (PaaS) system architecture according to an implementation of the disclosure.

FIG. 2 is a block diagram of a PaaS system architecture 200 according to an implementation of the disclosure. The PaaS architecture 200 allows users to launch software applications in a cloud computing environment, such as cloud computing environment provided in network architecture 100 described with respect to FIG. 1. The PaaS system architecture 200, in one implementation, includes a client layer 210, a broker layer 220, and a node layer 230.

In one implementation, the client layer 210 resides on a client machine, such as a workstation of a software developer, and provides an interface to a user of the client machine to a broker layer 220 of the PaaS system 200. For example, the broker layer 220 may facilitate the creation and deployment on the cloud (via node layer 230) of software applications being developed by an end user at client layer 210.

In one implementation, the client layer 210 includes a source code management system 212, sometimes referred to as "SCM" or revision control system. One example of such an SCM or revision control system is Git, available as open source software. Git, and other such distributed SCM systems, usually include a working directory for making changes, and a local software repository for storing the changes for each application associated with the end user of the PaaS system 200. The packaged software application can then be "pushed" from the local SCM repository to a remote SCM repository, such as app repos 233a, 233b, 233c, at the node(s) 232a, 232b, 232c running the associated application. From the remote SCM repository 233a, 233b, 233c, the code may be edited by others with access, or the application may be executed by a machine. Other SCM systems work in a similar manner.

The client layer 210, in one implementation, also includes a set of command tools 214 that a user can utilize to create, launch, and manage applications. In one implementation, the command tools 214 can be downloaded and installed on the user's client machine, and can be accessed via a command line interface or a graphical user interface, or some other type of interface. In one implementation, the command tools 214 expose an application programming interface ("API") of the broker layer 220 and perform other applications management tasks in an automated fashion using other interfaces, as will be described in more detail further below in accordance with some implementations.

In one implementation, the broker layer 220 acts as middleware between the client layer 210 and the node layer 230. The node layer 230 includes the nodes 232a-c on which software applications 235a-c are provisioned and executed. In one implementation, each node 232a-c is a VM provisioned by an Infrastructure as a Service (IaaS) provider. In other implementations, the nodes 232a-c may be physical machines (e.g., bare metal) or VMs residing on a single physical machine and running gears (discussed below) that provide functionality of applications of a multi-tenant PaaS system. In one implementation, the broker layer 220 is implemented on one or more machines, such as server computers, desktop computers, etc. In some implementations, the broker layer 220 may be implemented on one or more machines separate from machines implementing each of the client layer 210 and the node layer 230, or may implemented together with the client layer 210 and/or the node layer 230 on one or more machines, or some combination of the above.

In one implementation, the broker layer 220 includes a broker 222 that coordinates requests from the client layer 210 with actions to be performed at the node layer 230. One such request is new application creation. In one implementation, when a user, using the command tools 214 at client layer 210, requests the creation of a new application 235a-c, or some other action to manage the application 235a-c, the broker 222 first authenticates the user using an authentication service 224. In one implementation, the authentication service may comprise custom authentication methods, or standard protocols such as SAML, OAuth, etc. Once the user has been authenticated and allowed access to the system by authentication service 224, the broker 222 uses a server orchestration system 226 to collect information and configuration information about the nodes 232a-c.

In one implementation, the broker 222 uses the Marionette Collective™ ("MCollective™") framework available from Puppet Labs™ as the server orchestration system 226, but other server orchestration systems may also be used. The server orchestration system 226, in one implementation, functions to coordinate server-client interaction between multiple (sometimes a large number of) servers. In one implementation, the servers being orchestrated are nodes 232a-c, which are acting as application servers and web servers.

In one implementation, the broker 222 manages the business logic and model representing the nodes 232a-c and the applications 235a-c residing on the nodes, and acts as a controller that generates the actions requested by users via an API of the client tools 214. The server orchestration system 226 then takes the actions generated by the broker 222 and orchestrates their execution on the many nodes 232a-c managed by the system.

In one implementation, the information collected about the nodes 232a-c can be stored in a data store 228. In one implementation, the data store 228 can be a locally-hosted database or file store, or it can be a cloud based storage service provided by a Storage-as-a-Service (SaaS) provider, such as Amazon™ S3™ (Simple Storage Service). The broker 222 uses the information about the nodes 232a-c and their applications 235a-c to model the application hosting service and to maintain records about the nodes. In one implementation, data of a node 232a-c is stored in the form of a JavaScript Object Notation (JSON) blob or string that maintains key-value pairs to associate a unique identifier, a hostname, a list of applications, and other such attributes with the node.

In implementations of the disclosure, the PaaS system architecture 200 of FIG. 2 is a multi-tenant PaaS environment. In a multi-tenant PaaS environment, each node 232a-c runs multiple applications 235a-c that may be owned or managed by different users and/or organizations. As such, a first customer's deployed applications 235a-c may co-exist with any other customer's deployed applications on the same node 232 (VM) that is hosting the first customer's deployed applications 235a-c. In some implementations, portions of an application are run on multiple different nodes 232a-c. For example, as shown in FIG. 2, components of application 1 235a are run in both node 232a and node 232b. Similarly, application 2 235b is run in node 232a and node 232c, while application 3 235c is run in node 232b and node 232c.

In addition, each node also maintains a cartridge library 237. The cartridge library 237 maintains multiple software components (referred to herein as cartridges) that may be utilized by applications 235a-c deployed on node 232a-c. A cartridge can represent a form of support software (or middleware) providing the functionality, such as configuration templates, scripts, dependencies, to run an application 235a-c and/or add a feature to an application, 235a-c. In one implementation, the cartridges support languages such as, but not limited to, JBoss™, PHP, Ruby, Python, Perl, and so on. In addition, cartridges may be provided that support databases, such as MySQL™, PostgreSQL™, Mongo™, and others. Cartridges may also be available that support the build and continuous integration environments, such as a Jenkins cartridge. Lastly, cartridges may be provided to support management capabilities, such as PHPmyadmin, RockMongo™, 10 gen-mms-agent, cron scheduler, and HAProxy, for example. Adding an instance of a cartridge from cartridge library 237 to an application 235a-c provides a capability for the application 235a-c, without the customer who owns the application having to administer or update the included capability.

In one implementation, each node 232a-c is implemented as a VM and has an operating system 234a-c that can execute applications 235a-c using the app repos 233a-c and cartridge libraries 237 that are resident on the nodes 232a-c. Each node 302a-b also includes a server orchestration system agent (not shown) configured to track and collect information about the node 232a-c and to perform management actions on the node 232a-c. Thus, in one implementation, using MCollective™ as the server orchestration system 226, the server orchestration system agent at the node 232a-c can act as a MCollective™ server. The server orchestration system 226 would then act as the MCollective™ client that can send requests, queries, and commands to the MCollective™ server agent on node 232a-c.

As previously mentioned, cartridges provide the underlying support software that implements the functionality of applications 235a-c. In one implementation, an application 235a-c may utilize one or more cartridge instances 242 that are run in one or more resource-constrained gears 240 on nodes 232a-c. Cartridge library 237 provides an OS-based location, outside of all application gears 240, that acts as a source for cartridge instantiations 242 that provide functionality for an application 235a-c.

An application 235a-c may use more than one cartridge instance 240 as part of providing functionality for the application 235a-b. One example of this is a JavaEE application that uses a JBoss™ AS7 cartridge with a supporting MySQL™ database provided by a MySQL™ cartridge. Each cartridge instance 242 may include a software repository that provides the particular functionality of the cartridge instance 242.

As mentioned above, a gear 240 is a resource-constrained process space on the node 232a-c to execute functionality of an application 235a-c. In some implementations, a gear 240 is established by the node 232a-c with resource boundaries, including a limit and/or designation of the amount of memory, amount of storage, and security types and/or labels to be applied to any functions executed by the gear 240. In one implementation, gears 240 may be established using the Linux Containers (LXC) virtualization method. In further implementations, gears 240 may also be established using cgroups, SELinux™, and kernel namespaces, to name a few examples. As illustrated in FIG. 2, cartridges instances 242 for an application 235a-c may execute in gears 240 dispersed over more than one node 232a-b. In other implementations, cartridge instances 242 for an application 235a-c may run in one or more gears 240 on the same node 232a-c.

Implementations of the disclosure provide for measuring resource consumption by multi-tenant applications 235a-c hosted on nodes 232a-232c. In one implementation, broker layer 220 includes a usage tracking module 250 and billing provider integration module 260 to transactionally manage tracking PaaS system resource usage and invoicing for such tracked resource usage.

For each user of the PaaS system running applications using resources of the PaaS system, usage tracking module 250 may create and store usage records 229 in data store 228 for each activity associated with applications 235a-c of the user. Activities may generally include, but are not limited to, creation of a new application 235a-c, creation of a gear 240 for an application 235a-c, creation of a cartridge instance 242 in a gear 240, and addition of storage for use by an application 235a-c. In one implementation, gear usage, cartridges usage, and storage usage of an application 235a-c are the resources that are tracked for billing purposes of a user of the PaaS system.

In some implementations, the resources that incur billing charges are tracked for resource usage purposes, while other "non-billed" resources are not tracked. For example, there may be a subset of cartridge types that are considered "premium" and thus incur billing charges. As such, usage records may be generated when these "premium" cartridges are added to a gear 240, while adding any other type of "non-premium" cartridge does not result in the creation of a usage record. Similarly, usage may be tracked for additional storage that exceeds any storage that is provided to a user as part of plan or freely-given portion. In other implementations, all resource usage may be tracked regardless of whether such usage incurs billing charges or not.

Broker 222 may interact with usage tracking module 250 so that a usage record is created by usage tracking module 250 when it is confirmed that an activity associated with the usage record was completed successfully. This may be referred to as a "transactional" operation. A usage record may be an entry in the data store 228 (e.g., in a usage records collection portion of the data store 228) that identifies a user (e.g., an application ID or user ID), a resource (e.g., gear ID), a usage type (e.g., gear, cartridge, storage amount), a duration of the usage, and time stamp of the usage. The entry may contain additional information in some implementations of the disclosure and is not limited to the examples listed.

Each usage record may be associated with a single type of resource usage, so that an application 235a-c, and each gear 240 of an application, may be associated with more than one usage record. For example, application 235c is shown as consuming two gears (one on node 232b and one on node 232c). If each gear is using 10 additional GB of storage and one of the gears is also utilizing a "premium" cartridge, then there may be five usage records associated with application 235c: a usage record for each gear (2), a usage record for each gear using additional storage (2), and a usage record for the gear with the premium cartridge (1).

To create usage records in accordance with a transactional operation (e.g., usage record created and stored upon confirmation of successful completion of initiation of usage type), the broker 222 may maintain a list of activities (e.g., a "mapping") associated with initiation of a usage type. Within the list of activities, the creation of the usage record is listed as the last item. As the operations associated with initiating and implementing a resource for an application take multiple operations and can be long-running (e.g., it is not an instantaneous operation), creating a usage record upon initiation of a resource usage type is not practical. As such, a typical database transaction is not helpful in this situation. Instead, the broker 222 tracks the operations that it has completed in the mapping and, accordingly, is able to roll-back operations and/or resume operations within the mapping when it is interrupted. Furthermore, as the usage record is not created until after all of the operations in the mapping have been successfully completed, the broker 222 is able to ensure that a usage record is created and tracking resource usage when the resource is active and being correctly utilized. In some implementations, the location of the create usage record operation in a mapping of operations to initialize a resource may be at a location other than the last item in the mapping. Placement of the usage record creation operation in the mapping may be dependent on the particulars of the operations for the resource initialization.

As previously mentioned, in some implementations, a usage record can be added once a user and/or application exceeds an amount of "free" resource usage provided to the user by the PaaS system. In one implementation, the usage tracking module 250 may maintain threshold resource usage levels for each application 235a-c of a user and when any of those threshold levels are passed, the usage tracking module 250 may begin creating and store usage logs for the associated resources.

In implementations of the disclosure, the usage records may track time duration of usage in a fine-grained manner. For example, the time may be tracked to a millisecond level. In addition, the usage records track a last time (E.g., via a timestamp) that a usage record was synchronized ("synced") with a billing provider. In one implementation, the usage tracking module 250 call out to the billing provider integration module 260 to enable sending usage records to a billing provider associated with the billing provider integration module. The billing provider integration module 260 may be a plug-in specialized for communication with specific billing providers.

The usage tracking module 250 may cooperate with the billing provider integration module 260 to sync usage records with a billing provider a predetermined time intervals. Whenever a synchronization event occurs, the usage tracking module 250 may update the usage records that were successfully updated with a current time stamp. Then, the next time a synchronization event is executed, the usage tracking module 250 sends usage data from the previously-noted synchronization time through a current time. In some implementations, applications may be tracked at different cost rates depending on a state of the application. For example, an idle and/or stopped application may be tracked at a lower cost rate than an active application. This may change a type of the primary gear usage tracking record from an active record to an inactive record.

Usage record entries may fall into one of three categories: (1) a begin entry, (2) a continue entry, and (3) a complete entry. The begin entry is an entry that has been created and is tracking usage, but has not been sent out to a billing provider yet. The continue entry is an entry that has been created and is tracking resource usage and has also been sent at least once to the billing provider. The complete entry is an entry that has been created and tracked usage and has completed (e.g., the resource is no longer being utilized by the application) since the last time the usage record was sent to the billing provider.

The billing provider integration module 260 also implements state tracking functionality to maintain transactionality between the PaaS system and the billing provider. The PaaS system and the billing provider are two disconnected systems, and as such, there is no two-phase commit transactionality between the two disconnected systems. As a result, the billing provider integration module 260 provides the transactionality between the PaaS system and the billing provider by enforcing integrity of the data transfer operations between the two entities (PaaS system and billing provider). More specifically, the billing provider integration module 260 implements functionality to ensure that usage records, sent to a billing provider for synchronization purposes, are actually received by the billing provider.

In one implementation, the billing provider integration module 260 maintains synchronization data ("sync data") in each of the usage records that are sent for synchronization to a billing provider. The sync data may each include an ID for the usage record and a date and time stamp for when the usage record was last sent to the billing provider for synchronization. It should be noted that as part of the synchronization event, the billing provider is given, as metadata, the same sent date and time stamp that is stored by the billing provider integration module 260. As discussed further below, this sent data and time stamp can be used later by the billing provider integration module 260 for error checking purposes.

When the billing provider returns an indication of a successful receipt of a usage record data, the billing provider integration module 260 may mark the usage record as successfully synchronized. If the usage record is marked as a complete entry, then the usage record can be deleted. If the usage record is marked as a begin entry or continue entry, then the billing provider integration module 260 may change a continued date within the usage record to the synchronization date and time.

When there is no indication from the billing provider regarding receipt of the usage record data, then the next time the billing provider integration module 260 is called upon to perform a synchronization event, it accesses the usage record and determines that the last sent time and the synchronization time do not match (i.e., indicating that the synchronization for that usage record was not successful). In this case, the billing provider integration module 260 communicates with the billing provider to query whether the billing provider received the last sent usage record data.

In one implementation, the billing provider integration module 260 sends the usage record ID to the billing provider and requests an associated last sent date and time stamp associated with that usage record ID. If the billing provider maintains a record with the usage record ID, it then sends the last sent date and time stamp from the queried usage record ID. If this last sent date and time stamp match the corresponding data in the usage record at the PaaS system, then the billing provider integration module 260 marks the usage record as successfully synchronized as described above.

On the other hand, if billing provider does not have a record for the usage record ID or the last sent date and time stamp do not match, then the usage record can be sent again to the billing provider. As a result, the billing provider integration module 260 provides transactionality support to maintain integrity of usage record synchronizations between the PaaS system and the billing provider.

Figure 3:
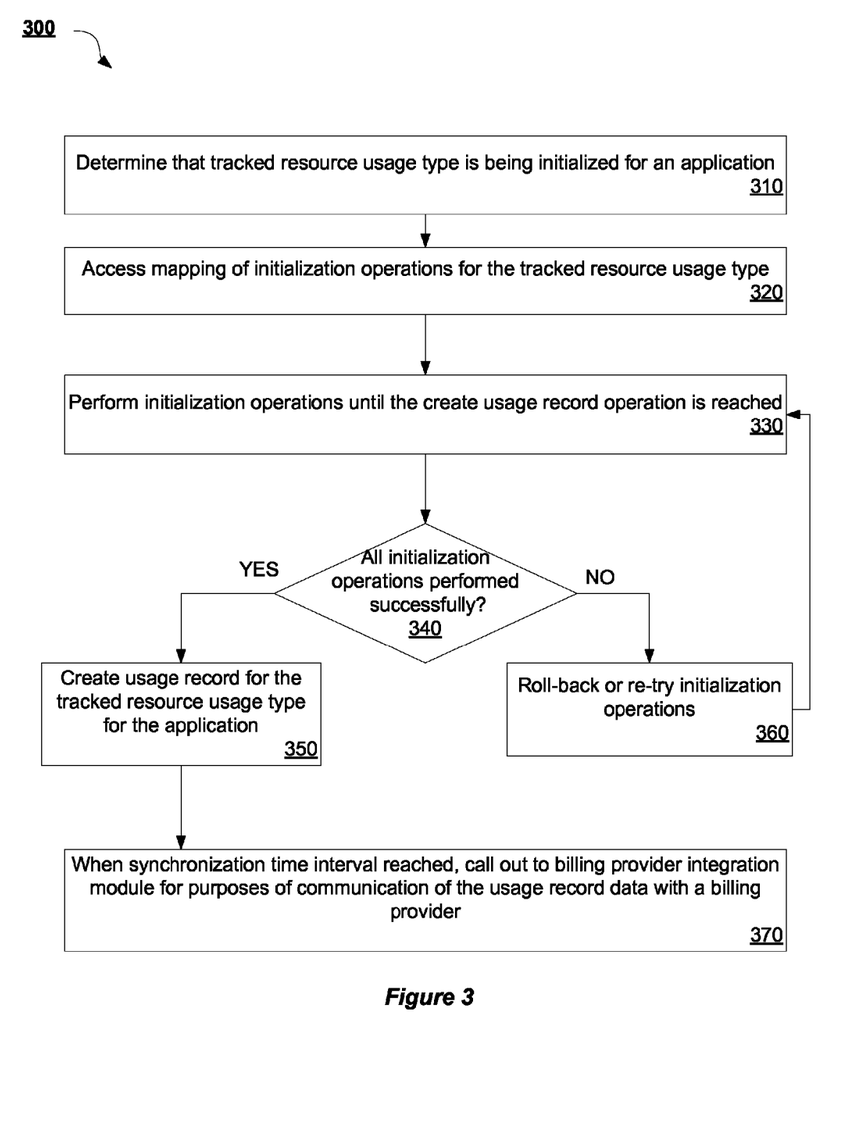
FIG. 3 is a flow diagram illustrating a method for measuring resource consumption in a multi-tenant PaaS system, according to an implementation of the disclosure.

FIG. 3 is a flow diagram illustrating a method 300 for measuring resource consumption in a multi-tenant PaaS system, according to an implementation of the disclosure. Method 300 may be performed by processing logic that may comprise hardware (e.g., circuitry, dedicated logic, programmable logic, microcode, etc.), software (such as instructions run on a processing device), firmware, or a combination thereof. In one implementation, method 300 is performed by usage tracking module 250 described with respect to FIG. 2.

Method 300 begins at block 310, where it is determined that a tracked resource usage type (e.g., gear, cartridge, storage) is being initialized for an application running on a multi-tenant PaaS system. In one implementation, an indication that tracking is enabled for the application is set prior to the determining that the tracked resource usage type is initialized. If tracking is not enabled then initialization of tracked resource usage types is ignored for purposes of tracking resource usage. In another implementation, the determination that a tracked resource usage type is initializing is made when a threshold of usage for the tracked resource usage type is exceeded. For example, when an application requests additional storage in excess of an allotted amount of storage associated with a billing plan of the application, the usage tracking module 250 may then make determinations of when the additional storage is initializing.

Then, at block 320, a mapping of initialization operations for the tracked resource usage type is accessed. In one implementation, the mapping of initialization operations includes a list of the operations performed by a broker component of the PaaS system to initialize the tracked resource for the application. At block 330, the initialization operations are performed until a create usage record operation is reached. In some implementations, the create usage record operation is the last operation in the mapping. In other implementations, the create usage record operation is located in a position other than last in the list of operations of the mapping.

At decision block 340, it is determined whether all of the initialization operations prior to the create usage record operation have been performed successfully. If not, then method 300 proceeds to block 360 to either roll-back operations in the mapping or re-try operations in the mapping, depending on the operations that have not been completed successfully. Method 300 may then return to block 330 to iterate through the operations of the mapping until the create usage record operation is reached again.

On the other hand, if all initialization operations prior to the create usage record operation have been performed successfully, method 300 proceeds to block 350 where a usage record is created for the tracked resource usage type for the application. A usage record may be an entry in a data store of the PaaS that identifies a user (e.g., an application ID or user ID), a resource (e.g., gear ID), a usage type (e.g., gear, cartridge, and storage amount), duration of the usage, and time stamp of the usage. The entry may contain additional information in some implementations of the disclosure and is not limited to the examples listed. Each usage record may be associated with a single type of resource usage, so that each gear of an application may be associated with more than one usage record.

Subsequently, at block 370, the usage tracking module calls out to a billing provider integration module of the PaaS when a synchronization time interval is reached. The call to the billing provider integration module is made for purposes of communicating usage record data to the billing provider.

Figure 4:
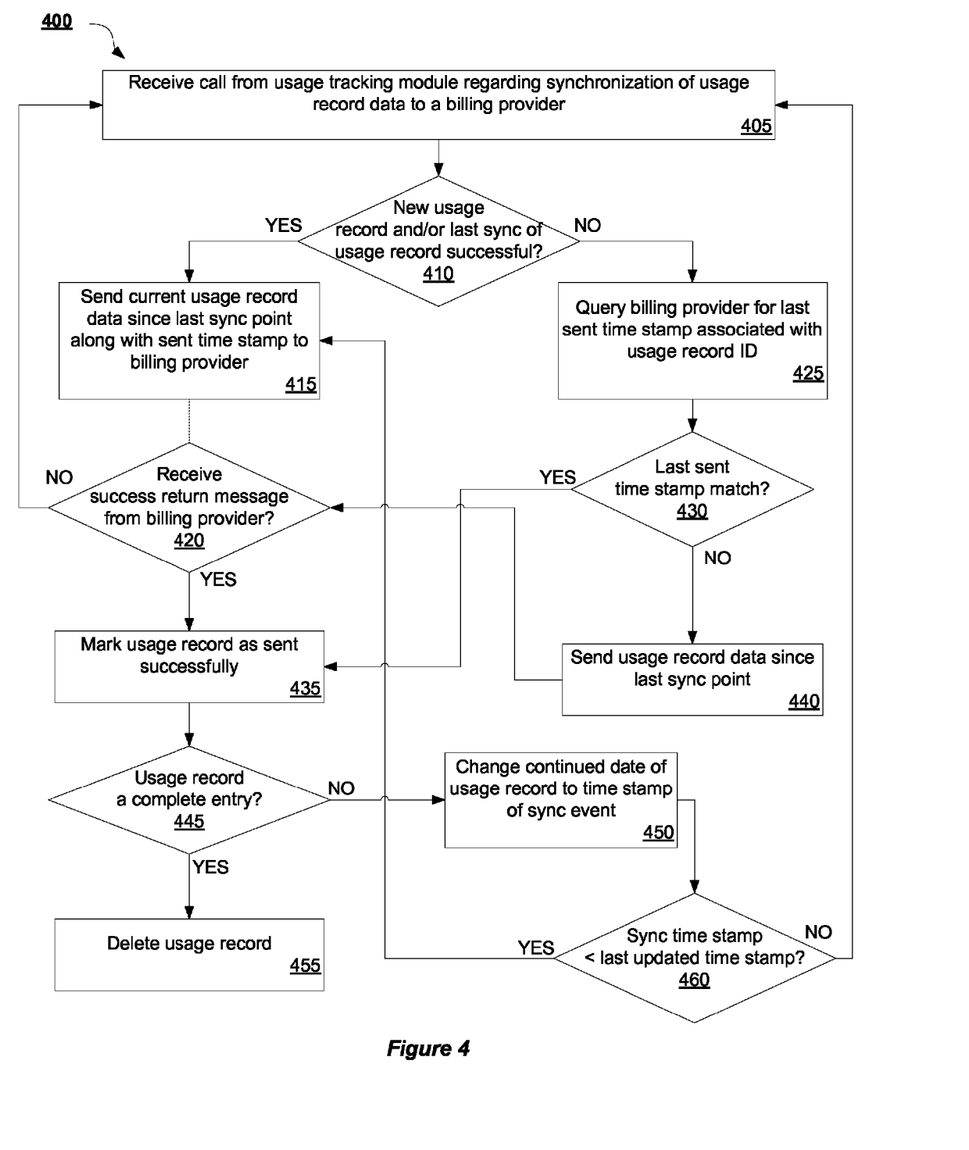
FIG. 4 is a flow diagram illustrating a method for communicating measured resource consumption in a multi-tenant PaaS system to a billing provider, according to an implementation of the disclosure.

FIG. 4 is a flow diagram illustrating a method 400 for communicating measured resource consumption in a multi-tenant PaaS system to a billing provider, according to an implementation of the disclosure. Method 400 may be performed by processing logic that may comprise hardware (e.g., circuitry, dedicated logic, programmable logic, microcode, etc.), software (such as instructions run on a processing device), firmware, or a combination thereof. In one implementation, method 400 is performed by billing provider integration module 260 described with respect to FIG. 2.

Method 400 begins at block 410, where a call is received from a usage tracking module regarding synchronization of usage record data to a billing provider. At decision block 410, it is determined whether the usage record associated with the call is a new usage record or, if not new, then whether a last synchronization event of the usage record to the billing provider was successful. In one implementation, the usage record includes a field indicating whether a last synchronization event was successful. The usage record may also include a field indicating a date/time stamp of a last sent update to a billing provider. If this field is empty, then the usage record can be considered new for purposes of the synchronization call.

If the usage record is new or if the usage record's last synchronization event was successful, then method 400 proceeds to block 415 where current usage record data tracked since the last synchronization event is sent to the billing provider. In addition, a date and time stamp of when the usage record data is sent is provided to the billing provider. The billing provider may store this sent date/time stamp as metadata with the usage record data on the billing provider end. At decision block 420, it is determined whether a success return message is received from the billing provider. If not, then method 400 takes no further action and returns to block 405 to wait to receive the next synchronization call related to the usage record.

If a success return message is received from the billing provider, then method 400 continues to block 435 where the usage record is marked as sent successfully. At decision block 445, it is determined whether the usage record is a complete entry. If so, the usage record is deleted at block 455 (as no additional resource usage tracking is performed for the resource and all usage data has been successfully synchronized with the billing provider). On the other hand, if the usage record is not a complete entry (e.g., it is a begin entry or a continue entry), then method 400 proceeds to block 450 where a continued date filed of the usage record is updated to reflect a date/time stamp of the successful synchronization event. In some implementations, sync date/time stamp is the same as the sent date/time stamp. In other implementations, the sync date/time stamp may reflect the date/time that the success return message from the billing provider is received.

At decision block 460, it is determined whether the sync time stamp is earlier than (in chronological time) a last updated time stamp of the usage record. In one implementation, the last updated time stamp reflects a time that the usage record was last updated to include resource usage tracking data. If the sync time stamp is earlier than the last updated time stamp, then the most recent usage data has not yet been sent to the billing provider and method 400 returns to block 415 to send the most current usage record data since the last sync point to the billing provider (along with the sent time stamp as metadata). Method 400 may then continue from block 415 as previously described above.

If the sync time stamp is equal to or later than the last updated time stamp, at decision block 460, then the most up-to-date usage record data has been successfully sent to the billing provider and method 400 returns to block 405 to wait to receive the next synchronization call related to the usage record.

Referring back to decision block 410, if the usage record is not new and the last synchronization event of the usage record is not indicated as successful, then method 400 proceeds to block 425. At block 425, the billing provider is queried for the last sent time stamp associated with a usage record ID of the usage record. At decision block 430, is determined whether the last sent time stamp received from the billing provider matches a last sent time stamp in the usage record. If so, then method 400 proceeds to block 435 to mark the usage record as successfully sent per the above description. On the other hand, if the last sent time stamp does not match the last sent time stamp in the usage record, then the last synchronization event was not successfully performed and method 400 proceeds to block 440. At block 440, usage record data since the last synchronization point is sent to the billing provider again. Then, method 400 proceeds to decision block 420 to determine whether there has been a successful receipt of the sent data from the billing provider, as detailed above.

Figure 5:
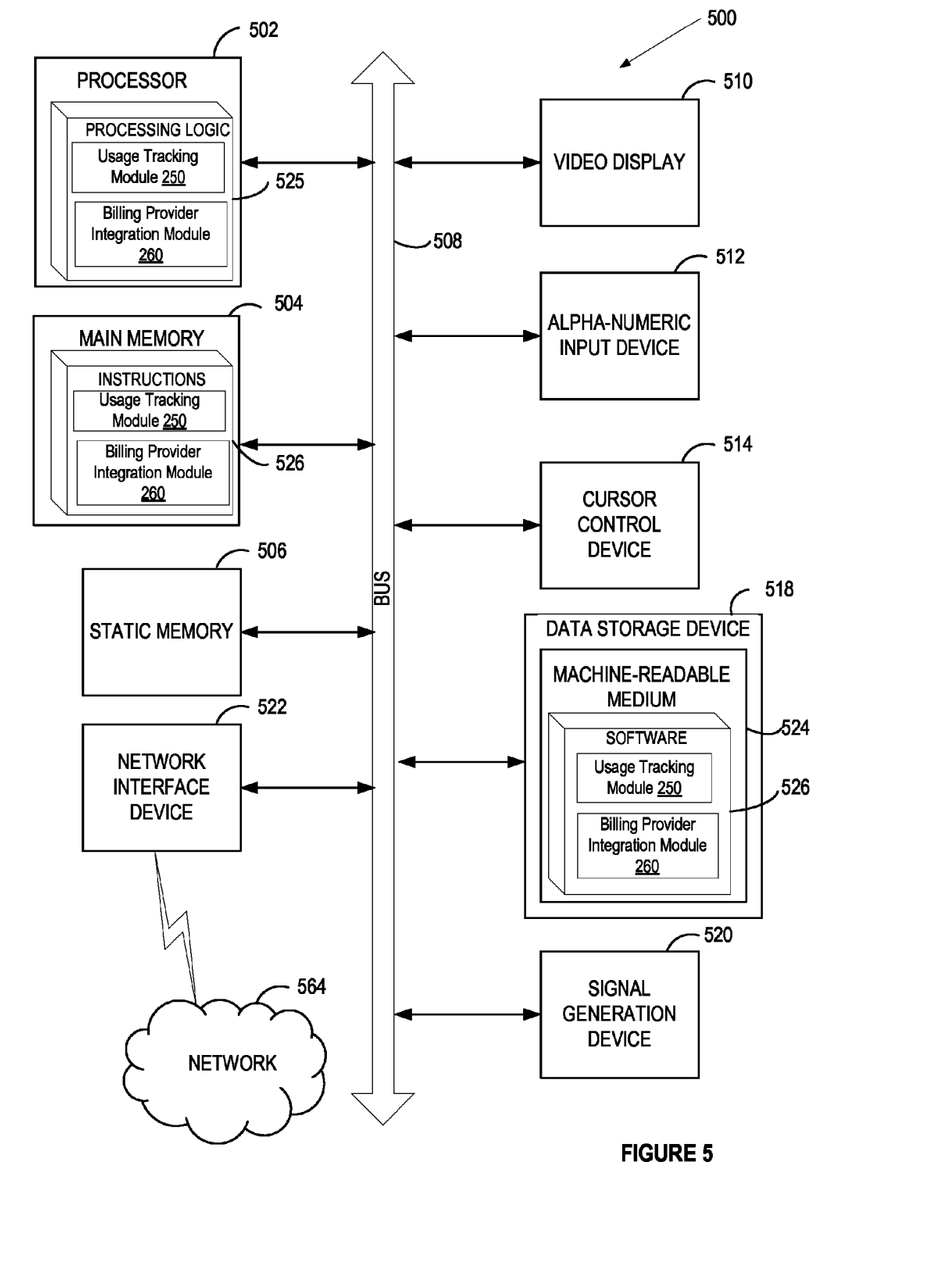
FIG. 5 illustrates a block diagram of one implementation of a computer system.

FIG. 5 illustrates a diagrammatic representation of a machine in the example form of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 includes a processing device 502 (e.g., processor, CPU, etc.), a main memory 504 (e.g., read-only memory (ROM), flash memory, dynamic random access memory (DRAM) (such as synchronous DRAM (SDRAM) or DRAM (RDRAM), etc.), a static memory 506 (e.g., flash memory, static random access memory (SRAM), etc.), and a data storage device 518, which communicate with each other via a bus 508.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 522 communicably coupled to a network 564. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 518 may include a machine-accessible storage medium 524 on which is stored software 526 embodying any one or more of the methodologies of functions described herein. The software 526 may also reside, completely or at least partially, within the main memory 504 as instructions 526 and/or within the processing device 502 as processing logic 526 during execution thereof by the computer system 500; the main memory 504 and the processing device 502 also constituting machine-accessible storage media.

The machine-readable storage medium 524 may also be used to store instructions 526 to implement a usage tracking module 250 and billing provider integration module 260 to measure resource consumption in a multi-tenant PaaS system, such as the usage tracking module 250 and billing provider integration module 260 described with respect to FIG. 3, and/or a software library containing methods that call the above applications. While the machine-accessible storage medium 524 is shown in an example implementation to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

In the foregoing description, numerous details are set forth. It will be apparent, however, that the disclosure may be practiced without these specific details. In some instances, well-known structures and devices are shown in block diagram form, rather than in detail, in order to avoid obscuring the disclosure.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "referencing", "determining", "providing", "implementing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the purposes, or it may comprise a general purpose computer selectively activated or reconfigured by a computer program stored in the computer. Such a computer program may be stored in a machine readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description below. In addition, the disclosure is not described with reference to any particular programming language. It will be appreciated that a variety of programming languages may be used to implement the teachings of the disclosure as described herein.

The disclosure may be provided as a computer program product, or software, that may include a machine-readable medium having stored thereon instructions, which may be used to program a computer system (or other electronic devices) to perform a process according to the disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A method, comprising:
   determining, by a processing device, that a resource of an application of a multi-tenant Platform-as-a-Service (PaaS) system is initializing, the resource marked for usage tracking;
   accessing a list of initialization operations used in the initialization of the resource;
   performing initialization operations from the list until reaching a create usage record operation in the list;
   determining that each of the initialization operations prior to a create usage record operation in the list of initialization operations is performed successfully;
   creating, by the processing device, a usage record for the resource using the create usage record operation in response to determining that each of the initialization operations prior to the create usage record operation in the list of initialization operations has performed successfully; and
   responsive to determining that at least one of the initialization operations prior to the create usage record operation in the list of initialization operations has failed, perform, by the processing device, a roll-back operation or a re-try operation for the failed initialization operation.

2. The method of claim 1, wherein the resource comprises at least one of a gear, a cartridge, or storage, wherein the gear comprises a resource-constrained process space of a node executing at least a portion of the application, and wherein the cartridge comprises support software providing a functionality of the application.

3. The method of claim 1, wherein the usage record comprises a user identifier (ID) associated with the application, a resource ID of the resource, a usage type of the resource, a duration of a usage of the resource, and a time stamp of a most recent update to the duration of the usage.

4. The method of claim 1, further comprising:
determining that a synchronization time interval for the usage record has expired; and
calling, in response to the expiration, an integration component of the PaaS system to communicate data of the usage record to a billing provider.

5. The method of claim 4, further comprising sending, to the billing provider, the data of the usage record and a current time stamp identifying when the data was sent from the PaaS system, the data comprising usage of the resource tracked since a previous successful synchronization of the usage record.

6. The method of claim 5, further comprising:
receiving, from the billing provider, an indication of successful receipt of the data sent to the billing provider; and
updating the usage record to reflect the indication of successful receipt and to include the time stamp identifying when the data was sent.

7. The method of claim 5, further comprising, prior to the sending the data:
determining whether a previous synchronization of the usage record is indicated to be successful; and
when the previous synchronization is not indicated to be successful, querying the billing provider for a sent time stamp associated with usage record identifier (ID) of the usage record.

8. The method of claim 7, further comprising:
comparing the sent time stamp received from the billing provider with a sent time stamp in the usage record;
when the sent time stamps match:
updating the usage record to reflect that the previous synchronization was successful and to include the sent time stamp; and
performing the sending the data; and
when the sent time stamps do not match, sending the data of the usage record comprising usage of the resource tracked since the previous synchronization of the usage record and the current time stamp identifying when the data was sent from the PaaS system.

9. A system, comprising:
a memory; and
a first processing device communicably coupled to the memory, the first processing device to:
determine that a resource of an application of a multi-tenant Platform-as-a-Service (PaaS) system is initializing, the resource marked for usage tracking;
access a list of initialization operations used in the initialization of the resource;
perform initialization operations from the list until reaching a create usage record operation in the list;
determine that each of the initialization operations prior to a create usage record operation in the list of initialization operations is performed successfully;
create a usage record for the resource using the create usage record operation in response to determining that each of the initialization operations prior to the create usage record operation in the list of initialization operations has performed successfully; and
in response to determining that at least one of the initialization operations prior to the create usage record operation in the list of initialization operations has failed, perform a roll-back operation or a re-try operation for the failed initialization operation.

10. The system of claim 9, wherein the resource comprises at least one of a gear, a cartridge, or storage, wherein the gear comprises a resource-constrained process space of a node executing at least a portion of the application, wherein the cartridge comprises support software providing a functionality of the application, and wherein the usage record comprises a user identifier (ID) associated with the application, a resource ID of the resource, a usage type of the resource, a duration of a usage of the resource, and a time stamp of a most recent update to the duration of the usage.

11. The system of claim 9, wherein the first processing device further to:
determine that a synchronization time interval for the usage record has expired; and
call, in response to the expiration, a second processing device of the PaaS system to communicate data of the usage record to a billing provider, wherein the second processing device is communicably coupled to the first processing device.

12. The system of claim 11, wherein the second processing device to send, to the billing provider, the data of the usage record and a current time stamp identifying when the data was sent from the PaaS system, the data comprising usage of the resource tracked since a previous successful synchronization of the usage record.

13. The system of claim 12, wherein the second processing device further to:
receive, from the billing provider, an indication of successful receipt of the data sent to the billing provider; and
update the usage record to reflect the indication of successful receipt and to include the time stamp identifying when the data was sent.

14. The system of claim 12, wherein the second processing device further to, prior to the sending the data:
determine whether a previous synchronization of the usage record is indicated to be successful; and
when the previous synchronization is not indicated to be successful, query the billing provider for a sent time stamp associated with usage record identifier (ID) of the usage record.

15. The system of claim 14, wherein the second processing device further to:
compare the sent time stamp received from the billing provider with a sent time stamp in the usage record;
when the sent time stamps match:
update the usage record to reflect that the previous synchronization was successful and to include the sent time stamp; and
perform the sending the data; and
when the sent time stamps do not match, send the data of the usage record comprising usage of the resource tracked since the previous synchronization of the usage record and the current time stamp identifying when the data was sent from the PaaS system.

16. A non-transitory machine-readable storage medium including data that, when accessed by a processing device, cause the processing device to:
determine, by the processing device, that a resource of an application of a multi-tenant Platform-as-a-Service (PaaS) system is initializing, the resource marked for usage tracking;
access a list of initialization operations used in the initialization of the resource;
perform initialization operations from the list until reaching a create usage record operation in the list;

determine that each of the initialization operations prior to a create usage record operation in the list of initialization operations is performed successfully;

create, by the processing device, a usage record for the resource using the create usage record operation in response to determining that each of the initialization operations prior to the create usage record operation in the list of initialization operations has performed successfully, wherein the usage record comprises at least one of a user identifier (ID) associated with the application, a resource ID of the resource, a usage type of the resource, a duration of a usage of the resource, and a time stamp of a most recent update to the duration of the usage;

responsive to determining that at least one of the initialization operations prior to the create usage record operation in the list of initialization operations has failed, perform a roll-back operation or a re-try operation for the failed initialization operation; and responsive to a synchronization time interval for the usage record expiring, send data of the usage record.

17. The non-transitory machine-readable storage medium of claim 16, wherein the resource comprises at least one of a gear, a cartridge, or storage, wherein the gear comprises a resource-constrained process space of a node executing at least a portion of the application, and wherein the cartridge comprises support software providing a functionality of the application.

18. The non-transitory machine-readable storage medium of claim 16, the processing device further to:

send, to a billing provider, the data of the usage record and a current time stamp identifying when the data was sent from the PaaS system, the data comprising usage of the resource tracked since a previous successful synchronization of the usage record;

receive, from the billing provider, an indication of successful receipt of the data sent to the billing provider; and update the usage record to reflect the indication of successful receipt and to include the time stamp identifying when the data was sent.

19. The non-transitory machine-readable storage medium of claim 18, prior to the sending the data, the processing device further to:

determine whether a previous synchronization of the usage record is indicated to be successful; and when the previous synchronization is not indicated to be successful, query the billing provider for a sent time stamp associated with usage record identifier (ID) of the usage record.

20. The non-transitory machine-readable storage medium of claim 19, the processing device further to:

compare the sent time stamp received from the billing provider with a sent time stamp in the usage record;

when the sent time stamps match:
update the usage record to reflect that the previous synchronization was successful and to include the sent time stamp; and
perform the sending the data; and when the sent time stamps do not match, send the data of the usage record comprising usage of the resource tracked since the previous synchronization of the usage record and the current time stamp identifying when the data was sent from the PaaS system.

* * * * *